(12) United States Patent
Goringe et al.

(10) Patent No.: US 7,984,294 B1
(45) Date of Patent: Jul. 19, 2011

(54) METHOD AND APPARATUS FOR TRUST BASED ROUTING IN DATA NETWORKS

(75) Inventors: Christopher Michael Goringe, Seven Hills (AU); Muneyb Minhazuddin, Quakers Hill (AU); Alexander Martin Scholte, Phegans Bay (AU); James Schreuder, Dulwich Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1858 days.

(21) Appl. No.: 11/106,314

(22) Filed: Apr. 14, 2005

(51) Int. Cl.
*H04L 29/06* (2006.01)
(52) U.S. Cl. ............... 713/166; 713/152; 726/2; 726/14; 380/239; 709/227; 709/238; 709/239
(58) Field of Classification Search .................. 713/1, 2, 713/188, 194, 166, 152; 380/200, 201, 255, 380/277, 239; 726/2, 14; 709/227, 238, 709/239
See application file for complete search history.

(56) References Cited

U.S. PATENT DOCUMENTS

| | | | | |
|---|---|---|---|---|
| 4,745,593 A * | 5/1988 | Stewart | ........................ | 370/244 |
| 5,602,916 A * | 2/1997 | Grube et al. | .................. | 380/270 |
| 6,178,505 B1 * | 1/2001 | Schneider et al. | ............ | 713/168 |
| 6,363,053 B1 * | 3/2002 | Schuster et al. | ............. | 370/230 |
| 6,766,373 B1 * | 7/2004 | Beadle et al. | ................. | 709/227 |
| 6,785,728 B1 * | 8/2004 | Schneider et al. | ............ | 709/229 |
| 6,976,087 B1 * | 12/2005 | Westfall et al. | ............... | 709/238 |
| 7,131,123 B2 * | 10/2006 | Suorsa et al. | ................. | 717/177 |
| 7,143,052 B2 * | 11/2006 | LaSalle et al. | .................... | 705/7 |
| 7,257,843 B2 * | 8/2007 | Fujita et al. | ...................... | 726/27 |
| 7,260,060 B1 * | 8/2007 | Abaye et al. | ................... | 370/230 |
| 7,277,546 B2 * | 10/2007 | Dhawan | ........................ | 380/269 |
| 7,328,349 B2 * | 2/2008 | Milliken | ....................... | 713/181 |
| 7,451,483 B2 * | 11/2008 | Chang et al. | .................... | 726/15 |
| 7,551,563 B2 * | 6/2009 | Beadle et al. | ................. | 370/238 |
| 7,580,919 B1 * | 8/2009 | Hannel et al. | ......................... | 1/1 |
| 7,716,718 B2 * | 5/2010 | Asada et al. | ...................... | 726/2 |
| 7,733,804 B2 * | 6/2010 | Hardjono et al. | ............ | 370/254 |
| 2002/0163889 A1 * | 11/2002 | Yemini et al. | ................. | 370/238 |
| 2005/0073961 A1 * | 4/2005 | Paik et al. | ..................... | 370/252 |
| 2005/0259594 A1 * | 11/2005 | Smith | .......................... | 370/254 |
| 2006/0087969 A1 * | 4/2006 | Santiago et al. | ............. | 370/229 |
| 2006/0218399 A1 * | 9/2006 | FitzGerald et al. | ........... | 713/168 |
| 2007/0133803 A1 * | 6/2007 | Saito et al. | .................... | 380/267 |
| 2008/0172366 A1 * | 7/2008 | Hannel et al. | .................... | 707/3 |

* cited by examiner

*Primary Examiner* — Zachary A Davis
*Assistant Examiner* — Joseph Pan
(74) *Attorney, Agent, or Firm* — John C. Moran

(57) ABSTRACT

A method and apparatus determine a trust level of a path through a plurality of routers by an endpoint by transmitting a path setup message requesting a path reservation for a first path through a subset of the routers, by receiving in response to transmission of the path setup message a trust level message containing trust level information inserted by each router in the first path through the subset, and by evaluating the inserted trust level information to determine if the first path has a sufficient trust level. Another method and apparatus gather trust level information from a router by receiving a trust level message into which a trust level of the router can be inserted, by inserting trust level information of the router into the trust level message, and by re-transmitting the trust level message on a designated path.

18 Claims, 4 Drawing Sheets

FIG. 2

| V-2 | P | X | CC | M | PT | TTL | SEQUENCE NUMBER | |
|---|---|---|---|---|---|---|---|---|
| LENGTH 203 ||||||| C-NUM 204 | C-TYPE 206 |
| CERTIFICATE DATA 207 |||||||||

HEADER 201

US 7,984,294 B1

METHOD AND APPARATUS FOR TRUST BASED ROUTING IN DATA NETWORKS

TECHNICAL FIELD

The present invention relates to data networks and, in particular, to the path selection in such networks.

BACKGROUND

Within the prior art, it is a well recognized problem that security of transmission via many data networks such as the Internet is a major concern. Whereas, it is known to use certificates which are issued by a certificate authority to certify that an endpoint is indeed the claimed entity. However, the path between a sending endpoint and a receiving endpoint may contain routers which are not trustworthy. These routers may not be trustworthy because of their particular geographical location or they may be routers which the sending endpoint has knowledge are not desirable to be used to route the sending endpoint's information. This may be because of the country in which the router is located or the corporation or other institution owning/controlling a particular router. The problems arise when a particular router cannot be trusted because of the entity controlling the router or because of poor security maintained on the router that allows third parties to "hack" into the router to obtain information. If the security of the information being transmitted through the router cannot be guaranteed then there is a problem of a third party gaining access to this information and using it contrary to the desires of the user of the sending endpoint. If, for example, financial information is being transmitted, the user may suffer financial damage if the financial information falls into the hands of a third party. For example, credit card number theft is a lucrative crime and an insecure router can be utilized for third parties to gain access to credit card number information. In addition, proprietary information owned by the sending endpoint may be compromised as well by a third party gaining access to it.

A secure path is also desirable in other applications. For example, it is desirable that IP telephone calls be routed over trusted routers to prevent third parties from intercepting voice conversations.

Within the prior art, it is known to establish an Internet or other data connection between two remote locations by choosing routes based on characteristics such as bandwidth, delay jitter, etc.

SUMMARY

A method and apparatus determine a trust level of a path through a plurality of routers by an endpoint by transmitting a path setup message requesting a path reservation for a first path through a subset of the routers, by receiving in response to transmission of the path setup message a trust level message containing trust level information inserted by each router in the first path through the subset, and by evaluating the inserted trust level information to determine if the first path has a sufficient trust level.

A method and apparatus gather trust level information from a router by receiving a trust level message into which a trust level of the router can be inserted, by inserting trust level information of the router into the trust level message, and by re-transmitting the trust level message on a designated path.

BRIEF DESCRIPTION OF THE DRAWING

FIG. 2 illustrates a format of RSVP-TRUST message utilized by embodiments.

DETAILED DESCRIPTION

Figure 1:
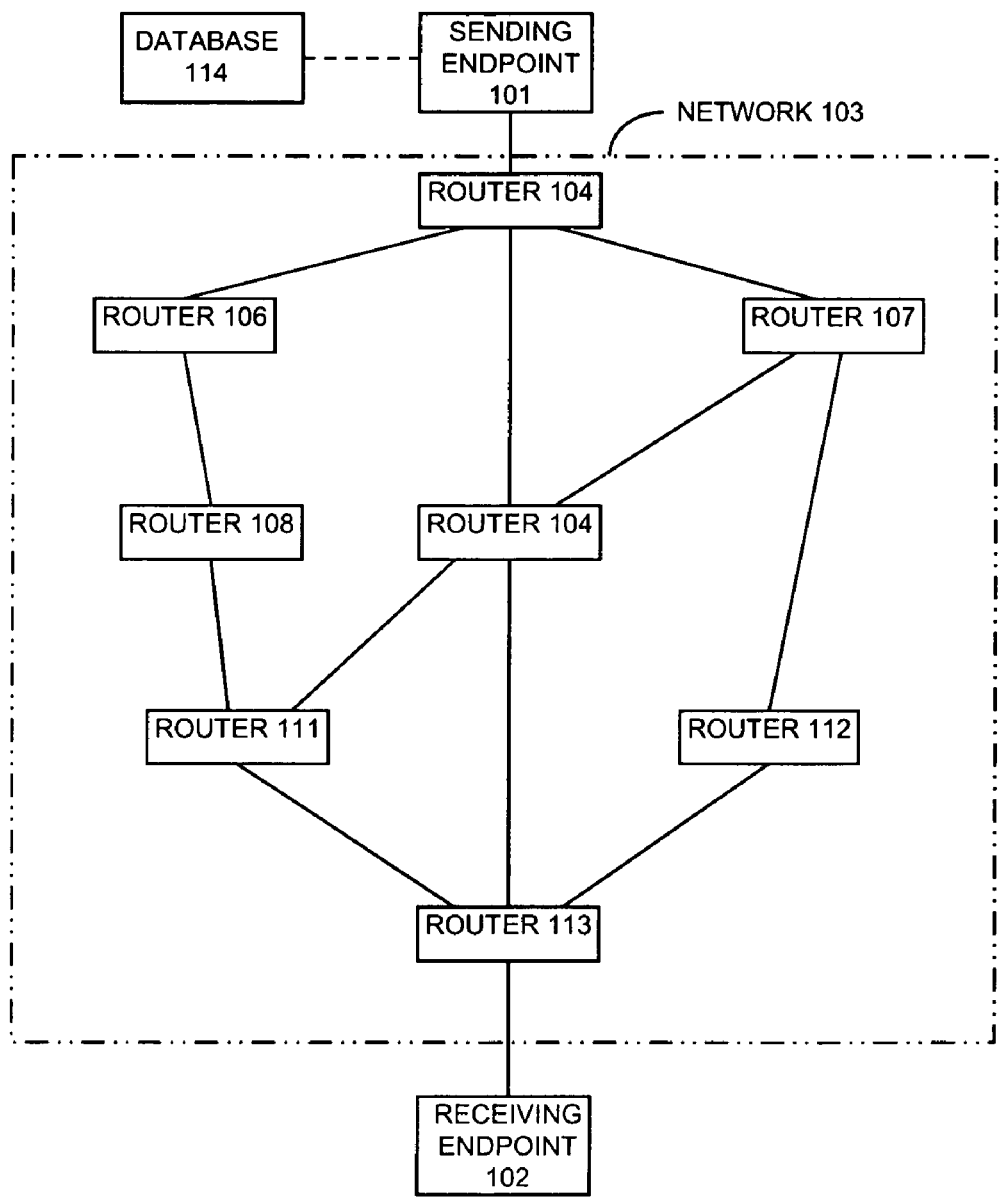
FIG. 1 illustrates an embodiment of a system.

Embodiments allow routes through a data network to be chosen based on the geographic location of the routers within the route, whether or not the router has a certificate signed by a certificate authority that the sending endpoint trusts, or if the IP and/or DNS names of the routers in the path are considered to be secure routers from the sending endpoint's point of view. An embodiment utilizing RSVP-TRUST messages so as to allow a sending endpoint to chose from a list of paths between the sending endpoint and the receiving endpoint. RSVP-TRUST messages are RSVP messages having a new object extension to allow the insertion of geographic location information, certificate data or router inserted information into the RSVP-TRUST messages. The format of these messages is explained in detail with respect to FIG. 2. This is accomplished by the sending endpoint first selecting a path from available paths and transmitting a PATH message on this selected path. As the PATH message is communicated to each router, each router relays the PATH message to the next router in the path towards the receiving endpoint. The end result is that the receiving endpoint receives the PATH message and responds by transmitting back an RSVP-TRUST message through the routers within the path. As the RSVP-TRUST message is received by each router, each router inserts information defining how trustworthy the router is. When the RSVP-TRUST message is received by the sending endpoint from the receiving endpoint, the sending endpoint determines if the path has a sufficient trust level to meet the requirements of the sending endpoint. If the path has a sufficient trust level, the sending endpoint then transmits a confirmation message to the sending endpoint via the selected path. In response, each router within the selected path will reserve the proper bandwidth, etc. characteristics for the data transmission on the selected path. If the path does not have a sufficient trust level, the sending endpoint will transmit RSVP-TEAR message on the path that was selected in order to cancel the reservations that had been made on the routers for this selected path. If the path does not have a sufficient trust level, the sending endpoint will select another available path and repeat the process.

In the various embodiments, the routers within a network path are responsive to the RSVP-TRUST message to insert into the message the geographic location of the router, one or more certificates, and/or the IP address and/or DNS name of the router. Routers in these embodiments may insert one or more pieces of this information. Also, a particular path may pass through a non-RSVP-TRUST router which has none of the trust information. Lack of trust information indicates that this router cannot be part of a trusted path. Non-RSVP-TRUST routers are determined by using trace route packets to determine the number of routers in a given path. This number of routers is compared with the number of routers returning RSVP-TRUST information.

In an embodiment, the geographic location can be established through the addition of GPS receivers in each router that defines the geographic location of a router, as suggested in specification RFC2009. Also the geographic location may be certified by a certificate from a certificate authority. In one embodiment, the router itself is certified by a certificate authority as being a secure router. In addition, one embodiment of the invention determines relative geographical location based on the IP address of the router. With respect to trusting an IP address and/or DNS name of a router, the sending endpoint again may rely on a certificate issued by a certificate authority similar to the manner that certificates are presently issued by a certificate authority, as is well known to one skilled in the art.

In various embodiments, the sending endpoint may be a server such as an email server, a personal computer interconnecting to a data network through a provider such as an Internet service provider, an IP-telephone, and other devices well known by those skilled in the art.

To better understand the various embodiments, consider the following example with respect to FIG. 1. Sending endpoint 101 is to establish a trusted data path through network 103 to receiving endpoint 102. First, sending endpoint 101 transmits a PATH message to receiving endpoint 102 via a path through routers 104, 109, and 113. When receiving endpoint 102 receives this PATH message, it transmits back a RSVP-TRUST via the path. The RSVP-TRUST message follows the path of the original PATH message. Each router in the path inserts the trust information plus reserves the path through that router. When the RSVP-TRUST message is received by sending endpoint 101, it utilizes information from database 114 to determine if the path is acceptable. If it is an acceptable path, sending endpoint 101 transmits a confirm message on that path. If the path is not acceptable, sending endpoint 101 transmits and RSVP-TEAR message on the path.

If the path is not acceptable, sending endpoint 101 transmits a PATH message to receiving endpoint 102 via a path through routers 104, 109, 111, and 113. When receiving endpoint 102 receives this PATH message, it transmits back a RSVP-TRUST via the path. The RSVP-TRUST PATH message follows the path of the original PATH message. Each router in the path inserts the trust information plus reserves the path through that router. When the RSVP-TRUST message is received by sending endpoint 101, it utilizes information from database 114 to determine if the path is acceptable. If it is an acceptable path, sending endpoint 101 transmits a confirm message on that path. If the path is not acceptable, sending endpoint 101 transmits and RSVP-TEAR message on the path.

If the second path is not acceptable, sending endpoint 101 transmits a PATH message to receiving endpoint 102 via a path through routers 104, 107, 112, and 113. When receiving endpoint 102 receives this PATH message, it transmits back a RSVP-TRUST via the path. The RSVP-TRUST PATH message follows the path of the original PATH message. Each router in the path inserts the trust information plus reserves the path through that router. When the RSVP-TRUST message is received by sending endpoint 101, it utilizes information from database 114 to determine if the path is acceptable. If it is an acceptable path, sending endpoint 101 transmits a confirm message on that path. If the path is not acceptable, sending endpoint 101 transmits and RSVP-TEAR message on the path.

Sending endpoint 101 continues to select paths to receiving endpoint 102 until it finds an acceptable path or exhausts the availability of paths.

Database 114 may be internal to sending endpoint 101 or may be interconnected to sending endpoint 101 via network 103. Database 114 in another embodiment may be distributed among a plurality of endpoints 101. Sending endpoint 101 may be a server, an end user personal computer, an IP telephone, or any other device known to those skilled in the art.

FIG. 2 illustrates a trust object that is part of a RSVP path message. Header fields 201 are the standard RSVP object header. Length field 203 defines the total length of the message. C-NUM field 204 is a unique number that identifies the trust object class and is different than any other type of class. The trust object class is a new class so that the C-NUM field 204 can be any agreed upon number. C-TYPE field 206 is the class type identifier and would be a "1". Length field 203 defines the total length of the message and would allow for a plurality of words containing certificate data fields 207. As each router in the return path receives the message illustrated in FIG. 2, it inserts its certificate data into the message as certificate data field 207. There would be a plurality of certificate data fields, one for each router. Note, it is possible that the router does not insert certificate data in which case, the route through this particular router would not be acceptable as is illustrated in greater detail with respect to FIG. 3. The trust object class is a new class and is not presently defined by the specifications. However, one skilled in the art would readily envision the extension of the trust object class based on the RFC2205 resource ReSerVation Protocol (RSVP), specification. Additional information about the extension of the RSVP protocol for additional objects can be found in the example set forth in RFC3209 RSVP-TE: Extension To RSVP For LSP Tunnels. These specifications would easily allow one skilled in the art to extend the basic RSVP protocol to include the trust object extension.

Figure 3:
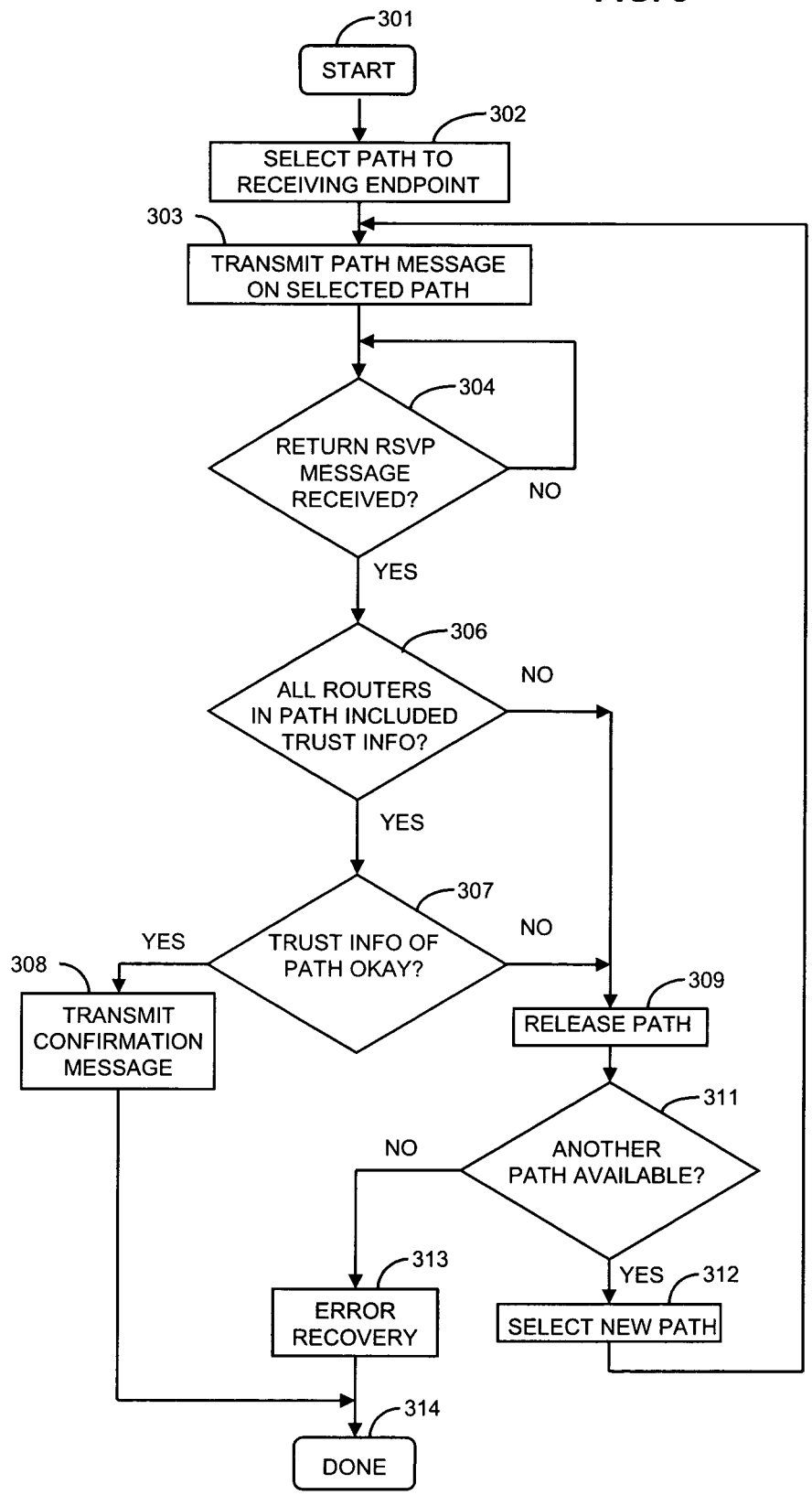
FIG. 3 illustrates, in flowchart form, operations performed by embodiments.

FIG. 3 illustrates, in flowchart form, operations performed by an embodiment in implementing the establishment of a path through a network having a guaranteed trust level. After being started in block 301, block 302 selects the initial path through the network to the receiving endpoint from the sending endpoint. Block 303 then transmits a path message on the selected path. Decision block 304 determines when the return RSVP message is received. When the return RSVP message is received, decision block 306 determines if all routers in the selected path have included trust information. If the answer is no in decision block 306, block 309 releases the path by the transmission of a RSVP-TEAR message before transferring control to decision block 311. Decision block 311 determines if there is another path to the receiving endpoint. If the answer is no, block 313 performs error recovery before terminating the operations in block 314. If the answer is yes in decision block 311, block 312 selects a new path and returns control back to block 303.

Returning to decision block 306, if the answer in decision block 306 is yes, control is transferred to decision block 307. The latter decision block determines if the trust information of the path defines a path of sufficient trustworthiness to allow the transmission of data between the sending endpoint and the receiving endpoint. As previously noted, the trust information can be geographical information and/or certificates issued by a certificate authority. If the trust information in the path does not meet the necessary requirements, control is transferred to block 309 which has already been discussed. If the trust information is sufficient, control is transferred to block 308 which transmits a confirmation message on the path, thereby establishing the path, before transferring control to block 314 which terminates the path setup process.

Figure 4:
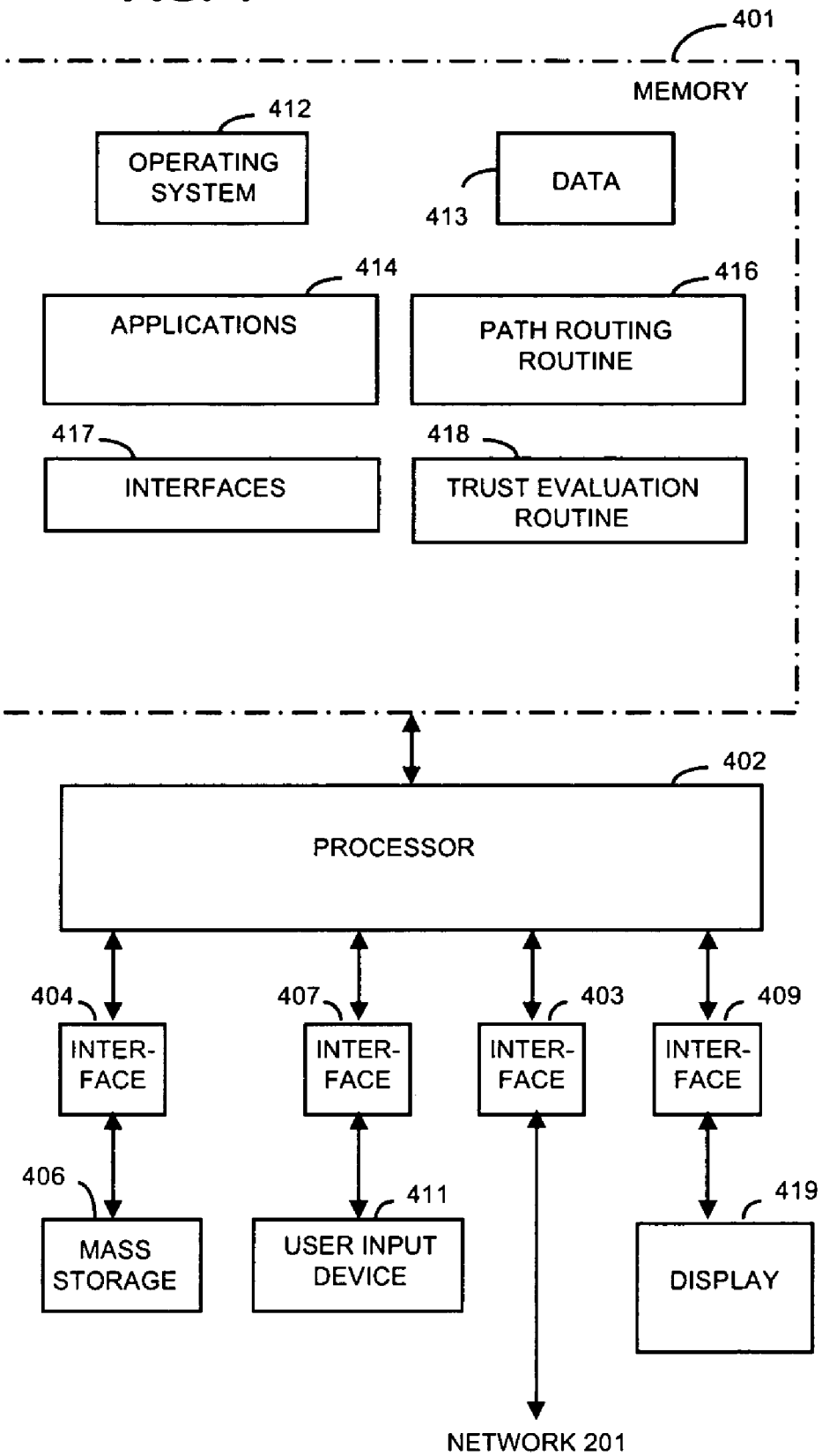
FIG. 4 illustrates, block diagram form, an embodiment of an network endpoint.

FIG. 4 illustrates, in block diagram form, an embodiment of a sending endpoint. The sending endpoint can be any type of an endpoint that interconnects to a digital network. The sending endpoint may be, but is not limited to, a server, printer, personal computer, personal digital assistant, or a telecommunication terminal. The embodiment illustrated in FIG. 4 is simply an example of many possible sending endpoints. Processor 402 controls the operation by execution of programs and utilizing data from memory 401. Additional storage is provided for the execution of operations by mass storage 406 that is interconnected to processor 402 via interface 404. Note, that mass storage 406 may be co-located with processor 402 or may be a remote database accessed by processor 402 via a network. A user can input information into processor 402 via user input device 411 and interface 407. The user can receive output from processor 402 via display 419 and interface 409. Processor 402 interconnects to network 201 via interface 403.

Operating system 412 controls the overall operation of processor 402. Applications 414 are applications that are performed in executing other operations not related directly to path routing and path trust evaluation. Interfaces 417 provide the software routines that control the operation of the various input/output devices illustrated in FIG. 4. Path routing routine 416 performs the operations illustrated in FIG. 3. Trust evaluation routine 418 processes the trust information and assures that the path has a sufficient level of trust so that the path may be utilized for data transfers.

When the operations of a sending endpoint are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The sending endpoint can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the sending endpoint is implemented in hardware, the sending endpoint can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for determining a trust level of a path through a plurality of routers of the Internet by an endpoint, comprising:
    transmitting a path setup message requesting a path reservation for a first path through a subset of the routers of the Internet;
    receiving in response to transmission of the path setup message a trust level message containing trust level information inserted by each router in the first path through the subset whereby the trust level information comprises the individual trust level of each router in the first path through the Internet; and
    evaluating the inserted trust level information to determine if the first path through the Internet has a sufficient trust level.

2. The method of claim 1 wherein the evaluating comprises determining trust level using at least one of geographic location information, certificates signed by certificate authority, or identities of known routers.

3. The method of claim 2 wherein the geographic location information is at least one of global positioning satellite information, location information certified by a certificate authority, or relative geographic location information based on a network address of a router.

4. The method of claim 1 further comprises re-performing the transmitting, receiving, and evaluating for a second path upon the evaluating determining that the first path does not have a sufficient trust level.

5. The method of claim 4 wherein the evaluating determines insufficient trust level if one router in the subset failed to insert any trust level information.

6. An apparatus for implementing the method of claim 1.

7. A method for gathering trust level information from a router in the Internet, comprising:
    receiving a trust level message into which a trust level of the router can be inserted;
    inserting trust level information of the router into the trust level message whereby the trust level defines the trust level of the router; and
    re-transmitting the trust level message on a designated path through the Internet.

8. The method of claim 7 wherein the inserting comprises determining trust level using at least one of geographic location information, certificates signed by certificate authority, or identity of the router.

9. The method of claim 8 wherein the geographic location information is at least one of global positioning satellite information, location information certified by a certificate authority, or relative geographic location information based on a network address of a router.

10. An apparatus for implementing the method of claim 7.

11. A non-transitory computer-readable medium for determining a trust level of a path through a plurality of routers of the Internet by an endpoint, comprising non-transitory computer-executable instructions configured for:
    transmitting a path setup message requesting a path reservation for a first path through a subset of the routers of the Internet;
    receiving in response to transmission of the path setup message a trust level message containing trust level information inserted by each router in the first path through the subset whereby the trust level information comprises the individual trust level of each router in the first path through the Internet; and evaluating the inserted trust level information to determine if the first path through the Internet has a sufficient trust level.

12. The non-transitory computer-readable medium of claim 11 wherein the computer-non-transitory-executable instructions for evaluating comprise computer-non-transitory-executable instructions for determining trust level using at least one of geographic location information, certificates signed by certificate authority, or identities of known routers.

13. The non-transitory computer-readable medium of claim 12 wherein the geographic location information is at least one of global positioning satellite information, location information certified by a certificate authority, or relative geographic location information based on a network address of a router.

14. The non-transitory computer-readable medium of claim 11 further comprises non-transitory computer-executable instructions for re-performing the non-transitory computer-executable instructions for transmitting, receiving, and evaluating for a second path upon the non-transitory computer-executable instructions for evaluating determining that the first path does not have a sufficient trust level.

15. The non-transitory computer-readable medium of claim 14 wherein the non-transitory computer-executable instructions for evaluating determine insufficient trust level if one router in the subset failed to insert any trust level information.

16. A non-transitory computer-readable medium for gathering trust level information from a router in the Internet, comprising non-transitory computer-executable instructions configured for:

receiving a trust level message into which a trust level of the router can be inserted;

inserting trust level information of the router into the trust level message whereby the trust level defines the trust level of the router; and re-transmitting the trust level message on a designated path through the Internet.

17. The non-transitory computer-readable medium of claim 16 wherein the non-transitory computer-executable instructions for inserting comprise non-transitory computer-executable instructions for determining trust level using at least one of geographic location information, certificates signed by certificate authority, or identity of the router.

18. The non-transitory computer-readable medium of claim 17 wherein the geographic location information is at least one of global positioning satellite information, location information certified by a certificate authority, or relative geographic location information based on a network address of a router.

* * * * *